(12) United States Patent
Chen (10) Patent No.: US 12,122,094 B2
(45) Date of Patent: Oct. 22, 2024

(54) THREE-DIMENSIONAL PRINTING WITH BLOCKED POLYISOCYANATES

(71) Applicant: Hewlett-Packard Development Company, L.P., Spring, TX (US)

(72) Inventor: Tienteh Chen, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 258 days.

(21) Appl. No.: 17/054,573

(22) PCT Filed: Mar. 22, 2019

(86) PCT No.: PCT/US2019/023711
§ 371 (c)(1),
(2) Date: Nov. 11, 2020

(87) PCT Pub. No.: WO2020/197540
PCT Pub. Date: Oct. 1, 2020

(65) Prior Publication Data
US 2022/0002586 A1    Jan. 6, 2022

(51) Int. Cl.
*B29C 64/165*    (2017.01)
*B22F 1/103*    (2022.01)
(Continued)

(52) U.S. Cl.
CPC ............ *B29C 64/165* (2017.08); *B22F 1/103* (2022.01); *B22F 1/107* (2022.01); *B22F 1/147* (2022.01);
(Continued)

(58) Field of Classification Search
CPC ..... B29C 64/165; B29C 64/295; B22F 1/103; B22F 1/107; B22F 1/147; B22F 10/14;
(Continued)

(56) References Cited

U.S. PATENT DOCUMENTS

| 7,267,928 B2 | 9/2007 | Mori |
| 2005/0171237 A1 | 8/2005 | Patel et al. |

(Continued)

FOREIGN PATENT DOCUMENTS

| CN | 1933961 A | 3/2007 |
| CN | 102947399 A | 2/2013 |

(Continued)

OTHER PUBLICATIONS

JP-2018041692-A: Espacenet English machine translation (Year: 2018).*

(Continued)

*Primary Examiner* — Adil A. Siddiqui
(74) *Attorney, Agent, or Firm* — Dierker & Kavanaugh, P.C.

(57) ABSTRACT

The present disclosure describes three-dimensional printing kits, systems for three-dimensional printing, and methods of three-dimensional printing. In one example, a three-dimensional printing kit can include a particulate build material and a binding agent. The particulate build material can include metal particles. The binding agent can include a polyhydroxy polyol and a water-dispersible blocked polyisocyanate having multiple blocked isocyanate groups. The blocked isocyanate groups can include a blocking group bonded to the carbon atom of the blocked isocyanate group through a labile bond breakable by heating to a deblocking temperature. Breaking the labile bond can produce a released blocking group reacted with hydrogen and an isocyanate group.

13 Claims, 4 Drawing Sheets

(51) Int. Cl.
<table>
<tr><td>B22F 1/107</td><td>(2022.01)</td></tr>
<tr><td>B22F 1/145</td><td>(2022.01)</td></tr>
<tr><td>B22F 10/14</td><td>(2021.01)</td></tr>
<tr><td>B22F 12/13</td><td>(2021.01)</td></tr>
<tr><td>B29C 64/295</td><td>(2017.01)</td></tr>
<tr><td>B29K 75/00</td><td>(2006.01)</td></tr>
<tr><td>B29K 505/12</td><td>(2006.01)</td></tr>
<tr><td>B33Y 10/00</td><td>(2015.01)</td></tr>
<tr><td>B33Y 30/00</td><td>(2015.01)</td></tr>
<tr><td>B33Y 70/10</td><td>(2020.01)</td></tr>
<tr><td>C08G 18/32</td><td>(2006.01)</td></tr>
<tr><td>C08G 18/34</td><td>(2006.01)</td></tr>
<tr><td>C08G 18/62</td><td>(2006.01)</td></tr>
<tr><td>C08K 3/11</td><td>(2018.01)</td></tr>
<tr><td>C09D 11/037</td><td>(2014.01)</td></tr>
<tr><td>C09D 11/102</td><td>(2014.01)</td></tr>
<tr><td>C09D 175/14</td><td>(2006.01)</td></tr>
</table>

(52) U.S. Cl.
CPC .............. *B22F 10/14* (2021.01); *B22F 12/13* (2021.01); *B29C 64/295* (2017.08); *B33Y 30/00* (2014.12); *B33Y 70/10* (2020.01); *C08G 18/3206* (2013.01); *C08G 18/348* (2013.01); *C08G 18/6225* (2013.01); *C09D 11/037* (2013.01); *C09D 11/102* (2013.01); *C09D 175/14* (2013.01); *B22F 2301/35* (2013.01); *B22F 2304/10* (2013.01); *B29K 2075/00* (2013.01); *B29K 2505/12* (2013.01); *B33Y 10/00* (2014.12); *C08K 3/11* (2018.01); *C08K 2201/005* (2013.01)

(58) Field of Classification Search
CPC .. B22F 12/13; B22F 2301/35; B22F 2304/10; B22F 2998/10; B33Y 30/00; B33Y 70/10; B33Y 10/00; B33Y 70/00; C08G 18/3206; C08G 18/348; C08G 18/6225; C08G 18/8067; C09D 11/037; C09D 11/102; C09D 175/14; B29K 2075/00; B29K 2505/12; C08K 3/11; C08K 2201/005; Y02P 10/25

See application file for complete search history.

(56) References Cited

U.S. PATENT DOCUMENTS

<table>
<tr><td>2007/0007698 A1</td><td>1/2007</td><td>Sano</td></tr>
<tr><td>2007/0205528 A1</td><td>9/2007</td><td>Patel et al.</td></tr>
<tr><td>2007/0241482 A1</td><td>10/2007</td><td>Giller et al.</td></tr>
<tr><td>2008/0281019 A1</td><td>11/2008</td><td>Giller et al.</td></tr>
<tr><td>2013/0085217 A1</td><td>4/2013</td><td>Iu et al.</td></tr>
<tr><td>2017/0144222 A1</td><td>5/2017</td><td>Daute et al.</td></tr>
<tr><td>2020/0190357 A1</td><td>6/2020</td><td>Rolland et al.</td></tr>
</table>

FOREIGN PATENT DOCUMENTS

<table>
<tr><td>CN</td><td>104479343</td><td></td><td>4/2015</td><td></td></tr>
<tr><td>CN</td><td>106687861</td><td>A</td><td>5/2017</td><td></td></tr>
<tr><td>CN</td><td>108885916</td><td>A</td><td>11/2018</td><td></td></tr>
<tr><td>EP</td><td>1193277</td><td>A2</td><td>4/2002</td><td></td></tr>
<tr><td>JP</td><td>2018041692</td><td>A *</td><td>3/2018</td><td></td></tr>
<tr><td>WO</td><td>WO-2017015159</td><td>A1</td><td>1/2017</td><td></td></tr>
<tr><td>WO</td><td>2017/170496</td><td>A1</td><td>10/2017</td><td></td></tr>
<tr><td>WO</td><td>WO-2019009906</td><td>A1 *</td><td>1/2019</td><td>.............. B22F 10/14</td></tr>
</table>

OTHER PUBLICATIONS

Chemtura; "Urethane Surface Coatings—Blocked Isocyanates"; Baxenden Chemicals Ltd; 2012; pp. 1-6 (Year: 2012).*

* cited by examiner

510 — Iteratively applying individual build material layers of a particulate build material including metal particles onto a support bed

520 — based on a 3D object model, selectively applying a binding agent to the individual build material layers to define individually patterned layers that are bound together to form a 3D green body object, wherein the binding agent comprises a polyhydroxy polyol, and a water-dispersible blocked polyisocyanate having multiple blocked isocyanate groups with the chemical structure:

where B is a blocking group bonded to the carbon atom of the blocked isocyanate group through a labile bond breakable by heating to a deblocking temperature, wherein breaking the labile bond produces a released blocking group reacted with hydrogen and an isocyanate group

FIG. 5

THREE-DIMENSIONAL PRINTING WITH BLOCKED POLYISOCYANATES

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

The present disclosure describes three-dimensional printing kits, systems, and methods. In one example, a three-dimensional printing kit can include a particulate build material and a binding agent. The particulate build material can include metal particles. The binding agent can include a polyhydroxy polyol, and a water-dispersible blocked polyisocyanate having multiple blocked isocyanate groups with the chemical structure:

where B is a blocking group bonded to the carbon atom of the blocked isocyanate group through a labile bond breakable by heating to a deblocking temperature. Breaking the labile bond produces a released blocking group reacted with hydrogen and an isocyanate group. In further examples, the metal particles can include titanium, cobalt, chromium, nickel, vanadium, tungsten, tungsten carbide, tantalum, molybdenum, copper, gold, silver, iron, ferrous alloy, stainless steel, steel, high carbon steel, tool steel, an alloy thereof, or an admixture thereof. In still further examples, the metal particles can have a D50 particle size distribution value from about 2 μm to about 100 μm. In certain examples, the water-dispersible blocked polyisocyanate can have an average of 3 to 10 blocked isocyanate groups per molecule. In other examples, the water-dispersible blocked polyisocyanate can include a hydrophilic dispersing group. In still further examples, the deblocking temperature can be from about 100° C. to about 200° C. In some examples, the released blocking group can include a phenol, a pyridinol, a thiophenol, a mercaptopyridine, an alcohol, a mercaptan, a lactam, an oxime, an amide, an imide, an azole, an imidazole, a pyrazole, a diketene, a formate, or a combination thereof. In a particular example, the binding agent can include the polyhydroxy polyol in an amount from about 1 wt % to about 15 wt % and the water-dispersible blocked polyisocyanate in an amount from about 1 wt % to about 25 wt % with respect to the total weight of the binding agent. In another example, the total moles of blocked isocyanate groups in the binding agent can be from about 105 mol % to 120 mol % of the total moles of hydroxy groups of the polyhydroxy polyol present in the binding agent.

The present disclosure also describes systems for three-dimensional printing. In one example, a system for three-dimensional printing can include particulate build material, a build material applicator to distribute a layer of the particulate build material onto a support bed, and a fluid ejector coupled to a binding agent and positioned to eject the binding agent onto the layer of particulate build material. The build material can include metal particles. The binding agent can include a polyhydroxy polyol, and a water-dispersible blocked polyisocyanate having multiple blocked isocyanate groups with the chemical structure:

where B is a blocking group bonded to the carbon atom of the blocked isocyanate group through a labile bond breakable by heating to a deblocking temperature. Breaking the labile bond produces a released blocking group reacted with hydrogen and an isocyanate group. In another example, the system can include a heater positioned to heat the layer of particulate build material and the binding agent on the layer of particulate build material to a deblocking temperature.

The present disclosure also describes methods of three-dimensional printing. In one example, a method of three-dimensional printing can include iteratively applying individual build material layers of a particulate build material including metal particles onto a support bed. A binding agent can be selectively applied, based on a 3D object model, to the individual build material layers to define individually patterned layers that are bound together to form a 3D green body object. The binding agent can include a polyhydroxy polyol and a water-dispersible blocked polyisocyanate having multiple blocked isocyanate groups with the chemical structure:

where B is a blocking group bonded to the carbon atom of the blocked isocyanate group through a labile bond breakable by heating to a deblocking temperature. Breaking the labile bond produces a released blocking group reacted with hydrogen and an isocyanate group. In a certain example, the binding agent can be applied by a thermal fluid jet ejector. In another example, the method can include heating the 3D green body object to the deblocking temperature. The deblocking temperature can be from about 100° C. to about 200° C. In yet another example, the method can also include sintering the 3D green body object at a sintering temperature from about 500° C. to about 3,500° C. to fuse the metal particles together and form a sintered 3D object.

The three-dimensional (3D) printing materials and processes described herein can be used to form metal 3D printed objects from a metal powder build material. The 3D printing process described herein can involve the application of successive layers of particulate build material with chemical binders or adhesives printed thereon to bind the successive layers of the particulate build materials together. In some processes, application of binding agents can be utilized to form a green body object and then a fused three-dimensional physical object can be formed therefrom. More specifically, binding agent can be selectively applied to a layer of a particulate build material on a support bed to pattern a selected region of the layer and then another layer of the particulate build material is applied thereon. The binding agent can be applied to the next layer of the particulate build material and these processes can be repeated to form a green part (also known as a 3D green body or object), which can then be heat fused to form a sintered 3D object.

Binding agents including polymers such as water soluble polymers or latex can be used to bind metal particles together to form a green body. The binding agent can include, for example, a liquid vehicle and polymer binder. The polymer binder can be dissolved or dispersed in a liquid vehicle, such as an aqueous vehicle, that is suitable for jetting from a fluid jet applicator. In some cases, the binding agents have been jetted onto layers of metal particulate build material and then heated sufficiently to evaporate water from the binding agent. After building up many layers in this way, a green body can be formed with a low water content, allowing the polymers from the binding agent to hold the metal particles together. However, in many cases the green body can be quite fragile at this point. The green body can be very porous and have many air voids. Because the green body is fragile, it can be difficult to remove the green body from the surrounding powder in the powder bed without damaging the green body.

The present disclosure describes a binding agent that includes a polyhydroxy polyol and a water-dispersible blocked polyisocyanate having multiple blocked isocyanate groups. This binding agent can have good jetting properties because the polyhydroxy polyol and water-dispersible blocked polyisocyanate have not yet polymerized at the time the binding agent is jetted onto the particulate build material. The binding agent can be jetted onto a layer of the particulate build material and then the layer of particulate build material can be heated to a deblocking temperature, such as a temperature from about 100° C. to about 200° C. Generally, heating to the deblocking temperature can be performed for individual layers or alternatively the green body as a whole can be formed first and then the entire green body can be heated to the deblocking temperature. At the deblocking temperature, the blocking groups that block the isocyanate groups of the polyisocyanate are removed. The isocyanate groups can then react with hydroxyl groups of the polyhydroxy polyol. Because the polyisocyanate molecules have multiple isocyanate groups, the polyisocyanate and the polyhydroxy polyol can react to form a crosslinked polymer network around the metal particles. This crosslinked polymer can make the green body stronger and more resistant to damage compared to other polymeric binders.

It is noted that when discussing the three-dimensional printing kits, the methods of three-dimensional printing, and/or the systems for three-dimensional printing herein, these discussions can be considered applicable to one another whether or not they are explicitly discussed in the context of that example. Thus, for example, when discussing a metal particle related to a three-dimensional printing kit, such disclosure is also relevant to and directly supported in the context of the method of three-dimensional printing, the system for three-dimensional printing, and vice versa.

It is also understood that terms used herein will take on their ordinary meaning in the relevant technical field unless specified otherwise. In some instances, there are terms defined more specifically throughout the specification or included at the end of the present specification, and thus, these terms can have a meaning as described herein.

Three-Dimensional Printing Kits

Figure 1:
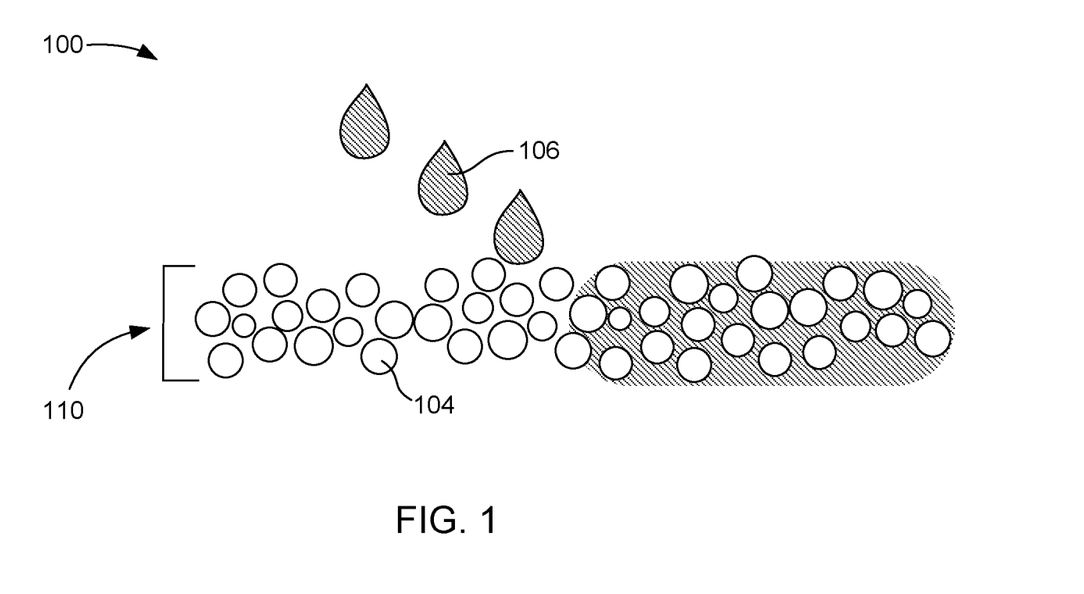
FIG. 1 graphically illustrates an example three-dimensional printing kit in accordance with the present disclosure.

In accordance with examples of the present disclosure, a three-dimensional printing kit 100 is shown in FIG. 1. The three-dimensional printing kit can include a binding agent 106, and a particulate build material 110 that can include metal particles 104. The binding agent, shown in FIG. 1 by example as droplets being applied to the particulate build material, may be packaged or co-packaged with the particulate build material in separate containers, and/or the binding agent and particulate build material can be loaded together in a system for three-dimensional printing.

Figure 2:
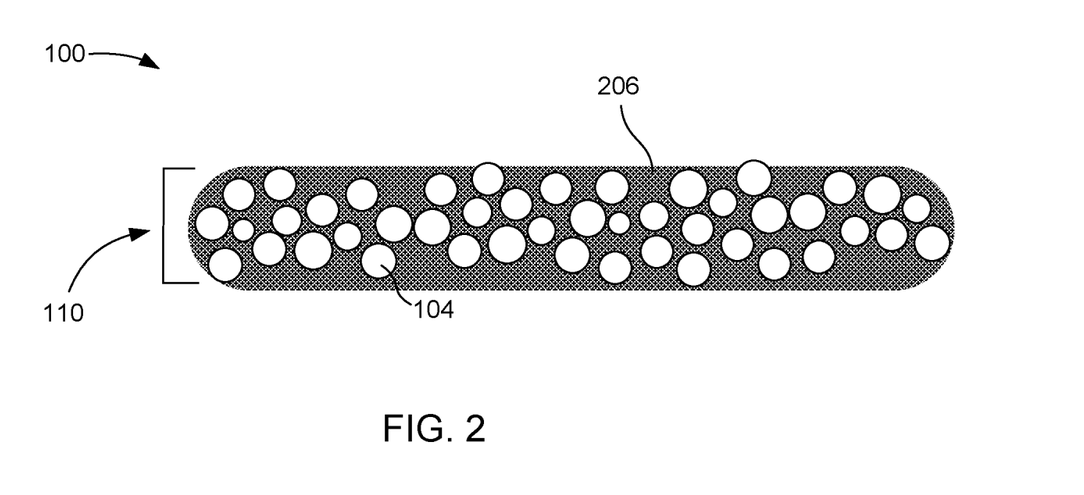
FIG. 2 graphically illustrates an example three-dimensional printing kit after deblocking in accordance with the present disclosure.

FIG. 2 shows the build material 110 after the binding agent has been applied and heated to a deblocking temperature to form a crosslinked polymer 206. The crosslinked polymer holds the metal particles 104 together. At this point, the metal particles bound together by the crosslinked polymer can be a green body ready for sintering, or additional layers of metal particles and binding agent can be added to form a green body. In some examples, the layers of metal particles can be jetted with the binding agent and then heated to form the crosslinked polymer. In other examples, the individual layers of metal particles can be jetted with the binding agent without heating the layers to the deblocking temperature. The entire green body can be formed in this way, and then the entire green body can subsequently be heated to the deblocking temperature. In some cases heating the entire green body to the deblocking temperature in this way can further strengthen the green body by promoting crosslinking between the individual layers of build material.

Build Material

The build material included in the three-dimensional printing kits described herein can be a particulate build material that includes metal particles. The particulate build material can include metal particles of any type that can be fused together at a fusing temperature (above the temperature at which the green body is formed, and above the deblocking temperature). Fusing can be carried out by sintering, annealing, melting, or the like, metal particles together within the particulate build material. In one example, the particulate build material can include from about 80 wt % to 100 wt % metal particles based on a total weight of the particulate build material.

In an example, the metal particles can be a single phase metallic material composed of one element. In this example, the fusing, e.g., sintering, annealing, etc., can occur at a temperature below the melting point of the element of the single phase metallic material. In other examples, the build material particles can be composed of two or more elements, which can be in the form of a single phase metallic alloy, e.g. the various particles can be alloys, or a multiple phase metallic alloy, e.g. different particles can include different metals. In these examples, fusing generally can occur over a range of temperatures. With respect to alloys, materials with a metal alloyed to a non-metal (such as a metal-metalloid alloy) can be used as well.

In some examples, the metal particles can include particles of elemental metals or alloys of titanium, cobalt, chromium, nickel, vanadium, tungsten, tungsten carbide, tantalum, molybdenum, copper, gold, silver, iron, ferrous alloy, stainless steel, steel, high carbon steel, tool steel, an alloy thereof, or an admixture thereof. In one example, the metal particles can be stainless steel.

The D50 particle size of the metal particles can range from about 2 μm to equal to or less than about 100 μm. In some examples, the particles can have a D50 particle size distribution value that can range from about 10 μm to about 100 μm, from about 20 μm to about 100 μm, from about 15 μm to about 90 μm, or from about 50 μm to about 100 μm. Individual particle sizes can be outside of these ranges, as the "D50 particle size" is defined as the particle size at which half of the particles are larger than the D50 particle size and about half of the other particles are smaller than the D50 particle size (by weight based on the metal particle content of the particulate build material).

As used herein, particle size can refer to a value of the diameter of spherical particles or in particles that are not spherical can refer to a longest dimension of that particle. The particle size can be presented as a Gaussian distribution or a Gaussian-like distribution (or normal or normal-like distribution). Gaussian-like distributions are distribution curves that can appear Gaussian in their distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of 25 μm means that 50% of the particles (by number) have a particle size greater than 25 μm and 50% of the particles have a particle size less than 25 μm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be "Gaussian" as used in practice. The shape of the particles of the particulate build material can be spherical, non-spherical, random shapes, or a combination thereof.

Binding Agent

The binding agent can include a polyhydroxy polyol and a water-dispersible blocked polyisocyanate having multiple blocked isocyanate groups. The polyhydroxy polyol can also be water-dispersible. The blocked isocyanate groups can have the chemical structure:

where B is a blocking group bonded to the carbon atom of the blocked isocyanate group through a labile bond that is breakable by heating to a deblocking temperature. Breaking the labile bond can produce a released blocking group reacted with hydrogen and an isocyanate group. In other words, the C—B bond can be broken by heating to the deblocking temperature. The —B group takes the H atom bonded to the N atom, becoming the released blocking group reacted with hydrogen (BH) and a N=C double bond forms, creating an isocyanate group (—N=C=O). After the isocyanate group has been deblocked in this way, the isocyanate group can react with a hydroxyl group of the polyhydroxy polyol to form a polyurethane polymer. Multiple isocyanate groups on individual polyisocyanate molecules can react in this way, forming a crosslinked polyurethane polymer. In some examples, the water-dispersible blocked polyisocyanate can have an average of 3 to 10 blocked isocyanate groups per molecule.

In further examples, the blocked polyisocyanate can include a hydrophilic dispersing group to increase the dispersibility of the blocked polyisocyanate in water. In some examples, the hydrophilic dispersing group can be anionic or nonionic. Non-limiting examples of hydrophilic dispersing groups can include polyethylene oxides, carboxylic acid groups or carboxylate groups, sulfonic acid groups or sulfonate groups, phosphonic acid groups or phosphonate groups, and others.

The blocking group attached to the isocyanate groups can be any group that attaches through a labile bond that can be broken by heating to a deblocking temperature. In certain examples, the blocking group (and/or the released blocking group reacted with hydrogen BH) can include a combination thereof. In some examples, these blocking groups can be released from the isocyanate groups at a deblocking temperature from about 100° C. to 200° C. Various combinations of polyisocyanate compounds with different blocking groups can have different deblocking temperatures. Generally, the deblocking temperature can be below the temperature at which the particulate build material is sintered together.

An example of a suitable blocked polyisocyanate trimer has the structure shown below:

where R is independently a C2 to C10 branched or straight-chained alkyl, C6 to C20 alicyclic, C6 to C20 aromatic, or a combination thereof; and Z is $(BL)_{3-X}(DL)_X$, wherein BL is selected from the group consisting of a phenol blocking group, a lactam blocking group, an oxime blocking group, an azole blocking group, a diketene blocking group, a formate blocking group, and combinations thereof; x is from 0 to 1; and DL is an anionic or a non-ionic hydrophilic dispersing group such as a polyethyleneoxide, carboxylic group, sulfonic group, or others. As such, Z independently includes a blocking group (the "BL" groups described herein), a hydrophilic dispersing group (the "DL" groups described herein), or a combination of both. In some examples, the three independent Z groups shown in the above formula can represent from 2 to 3 blocking groups (BL) and from 0 to 1 hydrophilic dispersing groups (DL) per trimer molecule. Thus, with specific reference to Z in the formula, there may be some specific individual molecules of the blocked polyisocyanate with three BL groups, and other individual molecules that include less than three BL groups. Thus, in some examples, there may be no hydrophilic dispersing groups, and in other examples there may be from 0.1 to 1 hydrophilic dispersing groups Non-limiting examples of commercially available anionic water-dispersible blocked polyisocyanates include IMPRAFIX® 2794 from Covestro (an HDI trimer blocked by 3,5-dimethyl pyrazole and further includes N-(2-aminoethyl)-beta-alaninate; acid number of 10 mg KOH/g) and BAYHYDUR® BL XP 2706 from Covestro (blocked aliphatic polyisocyanate, acid number of 32 mg KOH/g) (Covestro AG, Germany). IMPRAFIX® 2794 can be deblocked at about 130° C. Non-limiting examples of commercially available non-ionic blocked polyisocyanates that can be used include Matsui FIXER™ WF-N from Matsui Shikiso Chemical (a 3,5-dimethyl pyrazole non-ionic blocked polyisocyanate) (Matsui Shikiso Chemical, Japan) and TRIXENE® Aqua BI 220 from Baxenden (non-ionic aliphatic water-dispersed blocked isocyanate) (Baxenden Chemicals Limited, United Kingdom). Matsui FIXER™ WF-N can be deblocked at about 150° C. Additional example blocked polyisocyanates that can be used include BAYHYDUR® BL 2867, BAYHYDUR® BL 2781, BAYHYDUR® BL 5335, BAYBOND® XL 6366 XP, BAYBOND® XL 825, BAYBOND® XL 7270, BAYBOND® XL 3674 XP, which are from Covestro or VESTANAT® EP-DS 1205 E and VESTANAT® EP-DS 1076 from Evonik (Evonik Industries AG, Germany).

The polyhydroxy polyol used in the binding agent can be any water soluble or water dispersible polyhydroxy polyol. In some examples, the polyhydroxy polyol can include polyhydroxy polyesters, polyhydroxy polyurethanes, polyhydroxy polyethers, polycarbonate diols, and hydroxyl-containing polymers, such as polyhydroxy polyacrylates, polyacrylate polyurethanes, polyurethane polyacrylates, or combinations thereof. In further examples, the polyhydroxy polyol can be cationic, anionic, or nonionic. Non-limiting examples of commercially available polyhydroxy polyols that can be used include Bayhydrol® A145, A2058, A2227/1, A242, A2427, A2542, A2546, A2601, A2646, A2651, A2695, AXP2770, A2845XP, A2846XP, U241, U355, U475, UXP2750, U2757, UXP2766, UXP7110E, and combinations thereof (Covestro AG, Germany).

Figure 3:
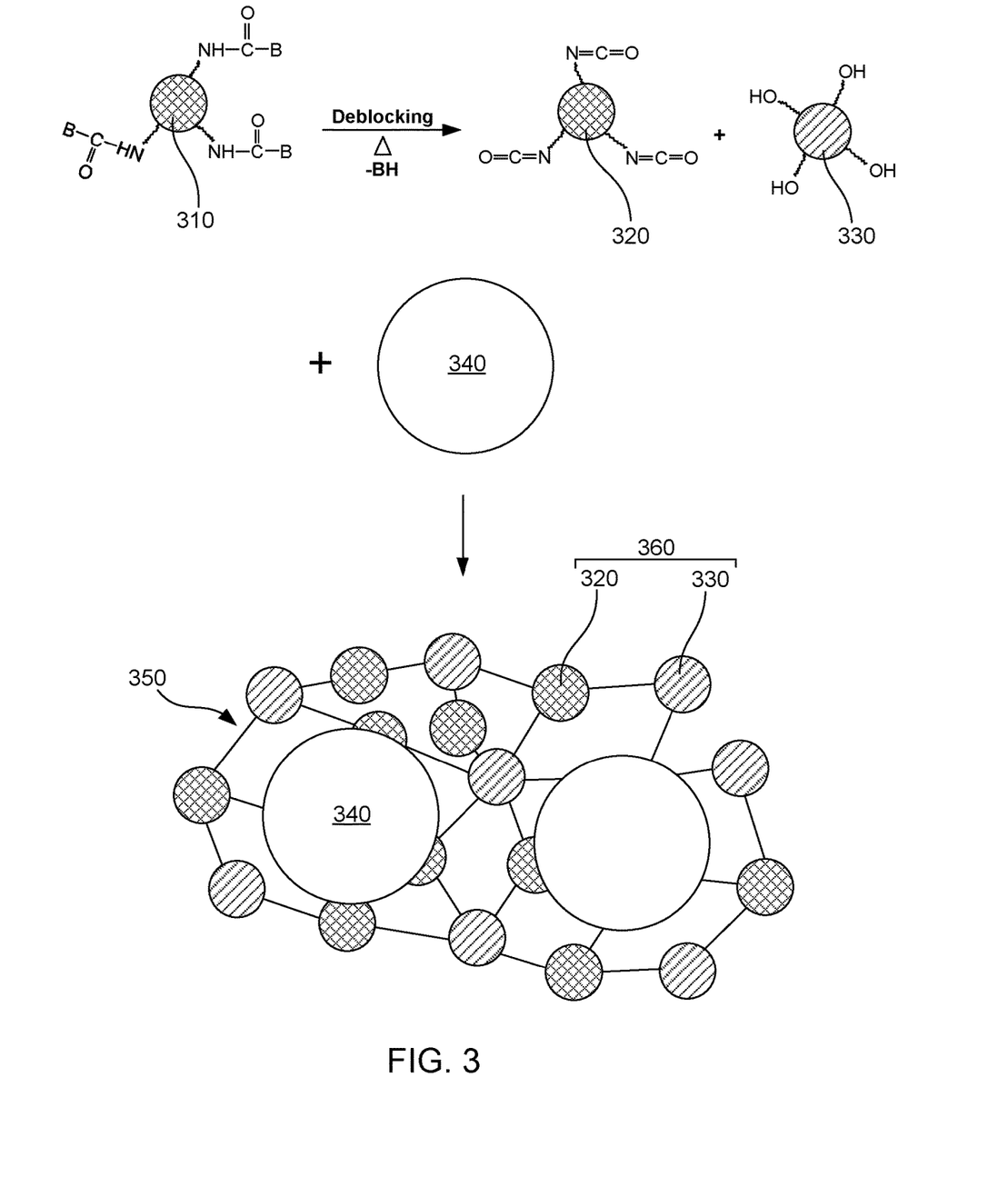
FIG. 3 is a schematic diagram of a curing reaction of a particulate build material and binding agent in an example three-dimensional printing kit in accordance with the present disclosure.

When the binding agent is applied to the particulate build material and then heated to the deblocking temperature, the blocked polyisocyanate can be deblocked and react with the polyhydroxy polyol to form a crosslinked polymer binding together the particulate build material. FIG. 3 shows a schematic example of this process. In the figure, a blocked polyisocyanate 310 is deblocked by heating at a deblocking temperature. The deblocked polyisocyanate 320 then reacts with a polyhydroxy polyol 330 in the presence of the particulate build material particles 340. The result is a crosslinked polyurethane polymer network 350 between and around the particulate build material particles, which includes the particulate build material associated with a reaction product of the deblocked polyisocyanate and the polyhydroxyl polyol. In some examples, this crosslinked polyurethane binder can give the green body greater strength than other types of binders, such as latex binders or water soluble polymer binders. In certain examples, the binding agent described herein can be devoid of other binders other than the blocked polyisocyanate and the polyhydroxy polyol. In further examples, the binding agent can be devoid of latex.

In some examples, the binding agent can include the polyhydroxy polyol in an amount from about 1 wt % to about 15 wt % based on the total weight of the binding agent. In further examples, the binding agent can include the polyhydroxy polyol in an amount from about 2 wt % to about 12 wt %, or from about 2 wt % to about 10 wt %, or from about 4 wt % to about 8 wt %. In still further examples, the binding agent can include the water-dispersible blocked polyisocyanate in an amount from about 1 wt % to about 25 wt %, or from about 2 wt % to about 20 wt %, or from about 5 wt % to about 15 wt %. In certain examples, the amounts of the polyhydroxy polyol and the water-dispersible blocked polyisocyanate can be selected based on the relative amounts of hydroxyl groups in the polyol and blocked isocyanate groups in the blocked polyisocyanate. In one example, the amounts of the water-dispersible blocked polyisocyanate and the polyhydroxy polyol can be selected so that the binding agent includes a molar excess of blocked isocyanate groups compared to hydroxyl groups. In some cases, the number of moles of commercially available blocked polyisocyanates and commercially available polyols can be calculated based on the equivalent weights provided by the manufacturers. In a particular example, the total moles of blocked isocyanate groups in the binding agent can be from about 105 mol % to 120 mol % of the total moles of hydroxyl groups of the polyhydroxy polyol present in the binding agent.

The binding agent can also include an aqueous vehicle suitable for jetting. In one example, the aqueous vehicle can include water as a major solvent, e.g., the solvent present at the highest concentration compared to other co-solvents. Apart from water, the aqueous vehicle can include organic co-solvent(s), such as high-boiling solvents and/or humectants, e.g., aliphatic alcohols, aromatic alcohols, alkyl diols, glycol ethers, polyglycol ethers, 2-pyrrolidinones, caprolactams, formamides, acetamides, and long chain alcohols. Some other more specific example organic co-solvents that can be included in the binding agent can include aliphatic alcohols, 1,2-alcohols, 1,3-alcohols, 1,4-alcohols, 1,5-alcohols, 1,6-alcohols, ethylene glycol alkyl ethers, propylene glycol alkyl ethers, higher homologs (C6-C12) of polyethylene glycol alkyl ethers, N-alkyl caprolactams, unsubstituted caprolactams, substituted formamides, unsubstituted formamides, substituted acetamides, unsubstituted acetamides, and combinations thereof. Examples of water-soluble high-boiling solvents can include propyleneglycol ethers, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl-1,3-propanediol, 1,2-butanediol, 1,4-butanediol, 1,2-pentanediol, 1,5 pentanediol, 1,2-hexanediol, 1,6-hexanediol, methylpyrrolidone, ethylpyrrolidone, and others. The organic co-solvent(s) in aggregate can be from 0 wt % to about 50 wt % of the binding agent. In some examples, co-solvents can be present at from about 5 wt % to about 25 wt %, from about 2 wt % to about 20 wt %, or from about 10 wt % to about 30 wt % of the binding agent. In other examples, co-solvents ca be present at from about 0 wt % to about 50 wt %, from about 5 wt % to about 25 wt %, from about 2 wt % to about 20 wt %, or from about 10 wt % to about 30 wt % of the total solvents in the binder.

The aqueous vehicle can be present in the binding agent at from about 20 wt % to about 98 wt %, from about 70 wt % to about 98 wt %, from about 50 wt % to about 90 wt %, or from about 25 wt % to about 75 wt. In some examples, the binding agent can further include from about 0.1 wt % to about 50 wt % of other liquid vehicle components. These liquid vehicle components can include other organic co-solvents, additives that inhibit growth of harmful microorganisms, viscosity modifiers, pH adjusters, sequestering agents, surfactants, preservatives, etc.

Some examples of liquid vehicle components that can inhibit the growth of harmful microorganisms that can be present can include biocides, fungicides, and other microbial agents. Commercially available examples can include ACTICIDE® (Thor GmbH, Germany), NUOSEPT® (Troy, Corp., New Jersey), UCARCIDE™ (Dow, Michigan), VANCIDE® (R.T. Vanderbilt Co., Connecticut), PROXEL® (Arch Chemicals, Inc., Connecticut), and combinations thereof.

In further examples, the binding agent can also include a catalyst to promote polymerization of the polyisocyanate and polyol. In certain examples, the catalyst can include a tin carboxylate such as dibutyltindilaurate or dibutyltindioctylate, a bismuth carboxylate, a zinc carboxylate, chelates of zirconium and aluminum, tertiary amines such as triethylenediamine, N,N,N',N'',N''-pentamethyldiethylenetriamine, 1,2-dimethylimidazole, or 1,4-diazabicyclo[2.2.2]octane (DABCO).

The crosslinked polyurethane polymer formed from the binding agent can undergo a pyrolysis or burnout process where the polymer is removed during the sintering or annealing process. This can occur when the thermal energy applied to a green part or object removes inorganic or organic volatiles and/or other materials that may be present either by decomposition or by burning the polymer.

Systems for Three-Dimensional Printing

Figure 4:
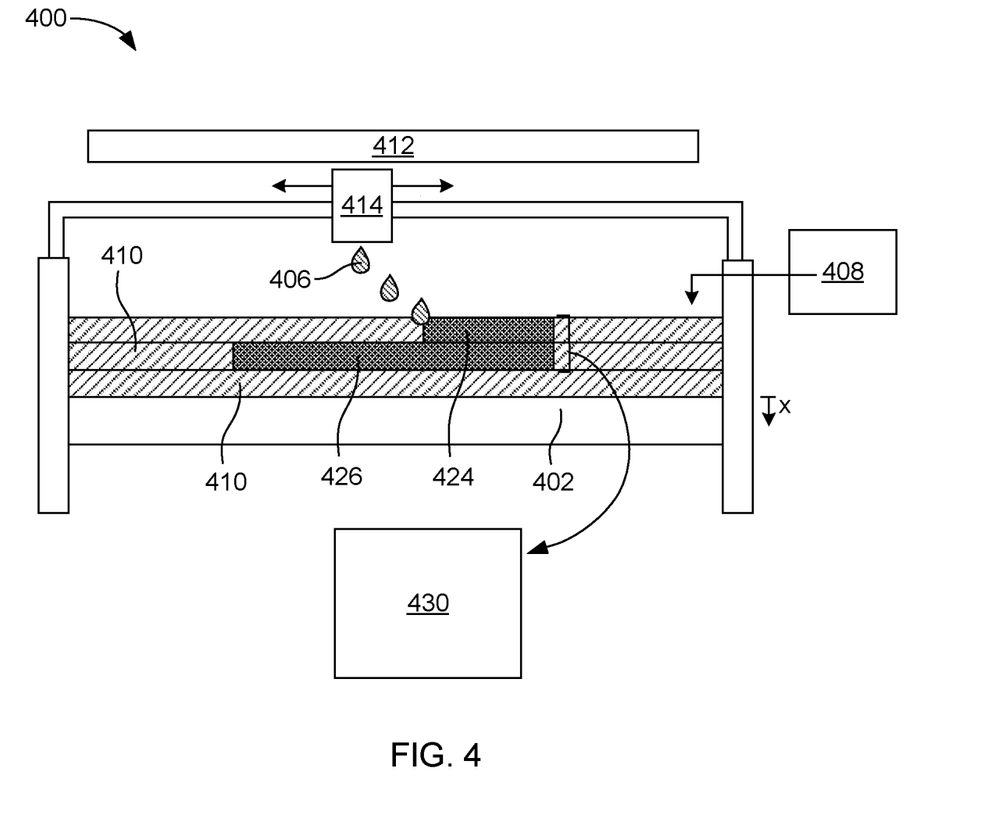
FIG. 4 is a schematic of a system for three-dimensional printing in accordance with the present disclosure.

The present disclosure also extends to systems for three-dimensional printing. The systems can generally include the particulate build material and the binding agent described above. The particulate build material can be distributed in individual layers by a build material applicator, and the binding agent can be jetted onto the layers by a fluid ejector. FIG. 4 shows an example system 400 for three-dimensional printing in accordance with the present disclosure. The system includes a build platform 402. Particulate build material 410 can be deposited onto the build platform by a build material applicator 408 where the particulate build material can be flatted or smoothed, such as by a mechanical roller or other flattening technique. This can form a flat layer of particulate built material. The binding agent 406 can then be applied to the layer by a fluid ejector 414. The area 424 where the binding agent is applied can correspond to a layer or slice of a 3D object model. The system can also include a heater 412 that can apply heat to the layers of particulate build material and binding agent that has been applied. The heater can heat the build material and binding agent to the deblocking temperature to cause the reaction producing a crosslinked polyurethane polymer to bind the particulate build material together. This can form a solid green body layer 426. In FIG. 4, a layer of the green body has been formed and then a new layer of particulate build material has been spread over the first green body layer. After individual layers are jetted with the binding agent, the build platform can be dropped by a distance of (x), which can correspond to the thickness of a printed layer to provide room for the new layer of particulate build material. The figure shows the binding agent being ejected onto this new layer of particulate build material. After the green body has been completely printed, the green body can be fused (e.g., sintered, annealed, etc.) in an oven 430.

As used herein, "applying individual build material layers of a particulate build material onto a support bed" can include applying the first layer of particulate build material that is applied directly to an empty support bed. The "support bed" can refer to the build platform, as shown in FIG. 4, for example. Additionally, in some examples, a layer or multiple layers of particulate build material can be laid on the support bed without jetting any binding agent onto the layers. This can provide a more thermally uniform temperature profile for the first layer to have the binding agent jetted thereon. Accordingly, "applying individual build material layers of a particulate build material onto a support bed" can include applying a layer of particulate build material onto the initial layer or layers that may be applied without any binding agent. The phrase "applying individual build material layers of a particulate build material onto a support bed" also includes applying to subsequent layers, when a layer or slice of the green body has already been formed in the layer below.

In further examples, the system can include a heater. The heater can be positioned above the particulate build material as in FIG. 4, or in other examples the heater can be on a side or sides of the particulate build material, below the particulate build material, or a combination of these locations. In some examples, the support bed can include an integrated heater to heat the particulate build material from below. Heating can heat the particulate build material to the deblocking temperature for deblocking the blocked polyisocyanate, and/or heating to a temperature sufficient to evaporate solvents from the binding agent. In certain examples, the heater can include a resistive heater, a heat lamp, infrared heater, halogen lamp, fluorescent lamp, oven, or other type of heater.

Methods of Three-Dimensional Printing

Figure 5:
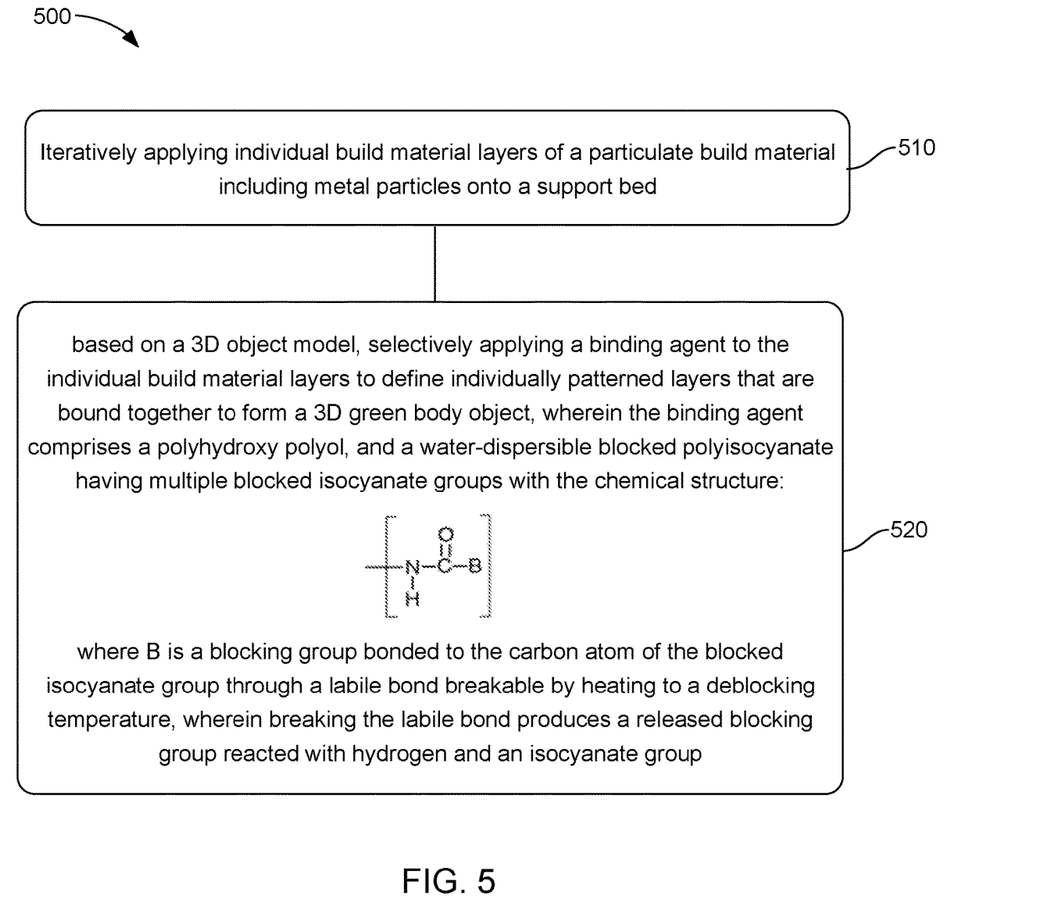
FIG. 5 is a flowchart illustrating an example method of three-dimensional printing in accordance with the present disclosure.

A flow diagram of an example method of three-dimensional (3D) printing 500 is shown in FIG. 5. The method includes: iteratively applying individual build material layers of a particulate build material including metal particles onto a support bed 510; and based on a 3D object model, selectively applying a binding agent to the individual build material layers to define individually patterned layers that are bound together to form a 3D green body object, wherein the binding agent includes:
    a polyhydroxy polyol, and
    a water-dispersible blocked polyisocyanate having multiple blocked isocyanate groups with the chemical structure:

where B is a blocking group bonded to the carbon atom of the blocked isocyanate group through a labile bond breakable by heating to a deblocking temperature, wherein breaking the labile bond produces a released blocking group reacted with hydrogen and an isocyanate group 520. The particulate build material including the metal particles and binding agent and related systems can be those described previously, for example.

In further detail, iteratively applying individual build material layers of the particulate build material can include applying individual build material layers at a thickness that can range from about 1 µm to about 150 µm, from about 20 µm to about 150 µm, from about 10 µm to about 100 µm, from about 25 µm to about 75 µm, from about 10 µm to about 50 µm, or from about 50 µm to about 125 µm. In some examples, the individual build material layer can have a thickness of from about 1 µm to about 100 µm.

The binding agent can be selectively printed from a fluid ejector. In some examples, the fluid ejector can be a print head that can be a piezoelectric print head, a thermal inkjet print head, or a continuous inkjet print head. After an individual build material layer is printed with binding agent, in some instances the individual build material layer can be heated to drive off water and to further solidify the layer of the 3D green body object. The build platform can be dropped a distance of (x), which can correspond to the thickness of a printed layer of the 3D green body object, so that another layer of the particulate build material can be added thereon, printed with binding agent, solidified, etc. The process can be repeated on a layer by layer basis until the entire 3D green body object is formed that is stable enough to move to an oven suitable for fusing, e.g., sintering, annealing, melting, or the like.

In some examples, heat can be applied to the individual build material layers (or group of layers) with binding agent printed thereon to drive off water from the binding agent and to further solidify the individual build material layers of the 3D green body object. In further examples, the heat can be sufficient to heat the build material to the deblocking temperature to deblock the blocked polyisocyanate in the binding agent. In one example, heat can be applied from overhead and/or can be provided by the build platform from beneath the particulate build material. In some examples, the particulate build material can be heated prior to dispensing. Further, the heating can occur upon application of the binding agent to the individual build material layers or following application of all the printed binding agent. The temperature(s) at which the metal particles of the particulate build material fuse together is/are above the temperature of the environment in which the patterning portion of the 3D printing method is performed, e.g., patterning at from about 18° C. to about 300° C. and fusing at from about 500° C. to about 3,500° C. In some examples, the metal particles of the particulate build material can have a melting point ranging from about 500° C. to about 3,500° C. In other examples, the metal particles of the particulate build material may be an alloy having a range of melting points.

Thus, following the formation of the 3D green body object, the entire 3D green body object can be moved to an oven and heated to a temperature ranging from about 500° C. to about 3,500° C., or more typically from about 600° C. to about 1,500° C. to fuse the metal particles together and to form a sintered 3D object. In some examples, the temperature can range from about 600° C. to about 1,200° C., from about 800° C. to about 1,200° C., or from about 750° C. to about 1,500° C. Depending on the metal particles, these temperature ranges can be used to melt an outer layer of the metal particles and can permit sintering of the metal particles to one another, while not melting an inner portion of the metal particles, in one example.

The eventual sintering temperature range can vary, depending on the material, but in one example, the sintering temperature can range from about 10° C. below the melting temperature of the metal particles of the particulate build material to about 50° C. below the melting temperature of the metal particles of the particulate build material. The sintering temperature can also depend upon the particle size and period of time that heating occurs, e.g., at a high temperature for a sufficient time to cause particle surfaces to become physically merged or composited together). For example, a sintering temperature for stainless steel can be about 1400° C. and an example of a sintering temperature for aluminum or aluminum alloys can range from about 550° C. to about 620° C. The sintering temperature can sinter and/or otherwise fuse the metal particles to form the sintered 3D object.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the phrase "green part," "green body," "3D green body object" and "layered green body" refers to any intermediate structure prior to any particle to particle material fusing, including a 3D green body object or object layer(s), a green 3D support structure or support structure layer(s), or an intermediate 3D breakaway interface or breakaway interface layer(s). As a green body, the particulate build material can be bound together by a binding agent. Typically, a mechanical strength of the green body is such that the green body can be handled or extracted from a build platform to place in a fusing oven. It is to be understood that any particulate build material that is not patterned with the binding agent is not considered to be part of the green body, even if the particulate build material is adjacent to or surrounds the green body. For example, unprinted particulate build material can act to support the green body while contained therein, but the particulate build material is not part of the green body unless the particulate build material is printed with binding agent, or some other fluid that is used to generate a solidified part prior to fusing, e.g., sintering, annealing, melting, etc.

As used herein, the terms "3D part," "3D object," or the like, refer to the target 3D object that is being built. The 3D object can be referred to as a "fused" or "sintered" 3D object, indicating that the object has been fused such as by sintering, annealing, melting, etc., or a "green body" or "green" 3D object, indicating the object has been solidified, but not fused.

As used herein, "kit" can be synonymous with and understood to include a plurality of compositions including multiple components where the different compositions can be separately contained in the same or multiple containers prior to and during use, e.g., building a 3D object, but these components can be combined together during a build process. The containers can be any type of a vessel, box, or receptacle made of any material.

The terms "fuse," "fusing," "fusion," or the like refer to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

A series of press bars were formed from stainless steel powder and a binding agent. The stainless steel powder and binding agent were mixed with a high-speed mixer to ensure homogenous mixing. The wet powder was dried in a vacuum oven at 30° C. for two hours until about 80% of water was removed. 18 g of this dry powder was poured into the opening of a press bar mold and pressed under 2000 psi for 30 seconds to form a press bar (50 mm (length), 12 mm (width) and 5.5 mm (thickness). The press bar was carefully separated from the mold and cured in a vacuum oven at 180° C. at a pressure of 22-25 inch Hg for 30 minutes with a slow stream of air. The cured press bar was cooled and submitted for a 3-point bend Instron® tester to measure the tensile strength.

Press bars were made using several different binding agent formulations to compare the tensile strength of the resulting press bars. For the different press bar formulations, five press bars were made and the average maximum tensile stress (mPa) and standard deviation are reported.

The blocked polyisocyanate included in the binding agent formulations was Covestro's Imprafix® 2794 blocked isocyanate dispersion (40% solid in water, % NCO is 4.8%). The polyol was varied across the different formulations. The polyol was from the series of Bayhydrol® water-based polyhydroxy polyols. The Bayhydrol® polyols used are shown in Table 1:

TABLE 1

| Bayhydrol ® Polyols | Type | % Solid | % OH | Eq Wt. |
|---|---|---|---|---|
| A 2546 | Acrylate Polyol | 41 | 4.8 | 354 |
| A 2601 | Acrylate Polyol | 45 | 3.9 | 436 |
| A 2542 | Acrylate Polyol | 50 | 3.8 | 447 |
| A 2695 | Acrylate Polyol | 41 | 5 | 340 |
| A 2846 | Acrylate Polyol | 40 | 1.5 | 1133 |
| A 2646 | Acrylate Polyol | 50 | 3.8 | 447 |
| UXP 2750 | Polyurethane Polyol | 41 | 3.6 | 472 |
| UXP 2766 | Polyurethane Polyol | 37 | 4 | 425 |
| U 2757 | Polyurethane Polyol | 52 | 1 | 1700 |

The various binding agent formulations are shown in Table 2. 10 wt % Imprafix® 2764 was used as the blocked polyisocyanate in the formulations. The polyol was different in the various formulation, and the amount of polyol was calculated based on the manufacturer-reported % OH of the polyol so that a 10 mol % excess of NCO was present compared to the number of moles of OH.

TABLE 2

| | | Sample No. | | | | | | | | | |
|---|---|---|---|---|---|---|---|---|---|---|---|
| Ink Components | % active | 1 (comp) | 2 (comp) | 3 | 4 | 5 | 6 | 7 | 8 | 9 | 10 |
| 1,2-Butanediol | as is | 26.0 | 26.00 | 26.0 | 26.0 | 26.0 | 26.0 | 26.0 | 26.0 | 26.0 | 26.0 |
| Tergitol ® 15-S-7 | 100 | 0.90 | 0.90 | 0.90 | 0.90 | 0.90 | 0.90 | 0.90 | 0.90 | 0.90 | 0.90 |
| Tergitol ® TMN-6 | 90 | 0.90 | 0.90 | 0.90 | 0.90 | 0.90 | 0.90 | 0.90 | 0.90 | 0.90 | 0.90 |
| Cyan Ink | 12.72 | 0.40 | 0.40 | 0.40 | 0.40 | 0.40 | 0.40 | 0.40 | 0.40 | 0.40 | 0.40 |
| Reaxis ® C708 | 100 | 0.01 | 0.01 | 0.01 | 0.01 | 0.01 | 0.01 | 0.01 | 0.01 | 0.01 | 0.01 |
| Latex | 32 | 10 | | | | | | | | | |
| Imprafix ® 2794 | 38.0 | | 10.00 | 10.0 | 10.0 | 10.0 | 10.0 | 10.0 | 10.0 | 10.0 | 10.0 |
| Bayhydrol ® A-2646 | 50.0 | | | 4.26 | | | | | | | |
| Bayhydrol ® UXP 2766 | 37.0 | | | | 4.05 | | | | | | |
| Bayhydrol ® U XP 2750 | 41.0 | | | | | 4.50 | | | | | |

TABLE 2-continued

| Ink Components | % active | 1 (comp) | 2 (comp) | 3 | 4 | 5 | 6 | 7 | 8 | 9 | 10 |
|---|---|---|---|---|---|---|---|---|---|---|---|
| Bayhydrol ® A 2695 | 41.0 | | | | | | 3.24 | | | | |
| Bayhydrol ® A-2546 | 41.0 | | | | | | | 3.38 | | | |
| Bayhydrol ® A2601 | 45.0 | | | | | | | | 4.15 | | |
| Bayhydrol ® A 2542 | 50.0 | | | | | | | | | 4.26 | |
| Bayhydrol ® A2846 | 40.0 | | | | | | | | | | 10.75 |

Amounts shown in Table 2 are parts by weight as dry content (i.e., excluding any water content the ingredients). Water is then added to make a total of 100 parts by weight. Cyan ink was used for visual inspection of powder mixing quality. Imprafix ® 2794 is commercial blocked isocyanate dispersion from Covestro Chemical Company.
Tergitol ® 15-S-7 and TMN-6 are surfactants from Dow (Michigan).
Reaxis ® C708 is Bi—Zn co-catalyst for polyurethane polymerization from Reaxis, Inc. (Pennsylvania).

The press bar formulation included 94.8 wt % stainless steel powder and 5.2 wt % binding agent. The stainless steel powder used for this study is PAC #1009 which has average particle size of 22 μm. Table 3 shows the maximum tensile stress and standard deviation of the cured press bars (5 press bars with the relevant binding agent formulation were tested and the maximum tensile stress was averaged).

TABLE 3

Average Maximum Tensile Stress of Cured Press Bar (Curing Temp = 180° C.)

| Sample No. | Latex (wt %) | Imprafix ® 2764 (wt %) | Polyol (wt %) | Polyhydroxy Polyol | Maximum Strength | STD |
|---|---|---|---|---|---|---|
| 1 (comp) | 10 | 0 | 0 | None | 4.0 | 0.1 |
| 2 (comp) | | 10 | 0 | None | 4.84 | 0.20 |
| 3 | | 10 | 4.26 | Bayhydrol ® A-2646 | 7.41 | 0.24 |
| 4 | | 10 | 4.05 | Bayhydrol ® UXP 2766 | 11.80 | 0.35 |
| 5 | | 10 | 4.5 | Bayhydrol ® U XP 2750 | 6.60 | 0.32 |
| 6 | | 10 | 3.24 | Bayhydrol ® A 2695 | 9.31 | 0.48 |
| 7 | | 10 | 3.38 | Bayhydrol ® A-2546 | 9.19 | 0.25 |
| 8 | | 10 | 4.15 | Bayhydrol ® A2601 | 10.46 | 0.46 |
| 9 | | 10 | 4.26 | Bayhydrol ® A 2542 | 7.64 | 0.47 |
| 10 | | 10 | 10.75 | Bayhydrol ® A2846 | 10.16 | 0.49 |

Based on these test results, the reaction products of the Imprafix® 2764 and the Bayhydrol® polyhydroxy polyols can be very strong binders for the metal powder. The formulations tested were stronger than the latex binder used in comparative sample 1. The formulations tested were also stronger than comparative sample 2, which included the Imprafix® 2764 without any polyol. Among the formulations tested, Bayhydrol® UXP 2766, A 2695, A-2546, A-2601 and A 2846 produced the best results, but all of the formulations are better than the comparative samples.

What is claimed is:

1. A three-dimensional printing kit, comprising:
   a particulate build material comprising metal particles; and
   a jettable binding agent that is separate from the particulate build material, the jettable binding agent comprising:
   a polyhydroxy polyol selected from the group consisting of an acrylate polyol and a polyurethane polyol;
   a water-dispersible blocked polyisocyanate having multiple blocked isocyanate groups, each having the chemical structure:

wherein B is a blocking group bonded to the carbon atom of the blocked isocyanate group through a labile bond that is breakable by heating to a deblocking temperature, wherein breaking the labile bond produces a released blocking group reacted with hydrogen and an isocyanate group; and
   an aqueous vehicle.

2. The three-dimensional printing kit of claim 1, wherein the metal particles are selected from the group consisting of titanium particles, cobalt particles, chromium particles, nickel particles, vanadium particles, tungsten particles, tungsten carbide particles, tantalum particles, molybdenum particles, copper particles, gold particles, silver particles, iron particles, ferrous alloy particles, stainless steel particles, steel particles, high carbon steel particles, tool steel particles, and an admixture thereof.

3. The three-dimensional printing kit of claim 1, wherein the metal particles have a D50 particle size distribution value of from about 2 μm to about 100 μm.

4. The three-dimensional printing kit of claim 1, wherein the water-dispersible blocked polyisocyanate has an average of 3 to 10 blocked isocyanate groups per water-dispersible blocked polyisocyanate molecule.

5. The three-dimensional printing kit of claim 1, wherein the water-dispersible blocked polyisocyanate comprises a hydrophilic dispersing group.

6. The three-dimensional printing kit of claim 1, wherein the deblocking temperature is from about 100° C. to about 200° C.

7. The three-dimensional printing kit of claim 1, wherein the released blocking group is selected from the group consisting of a phenol group, a pyridinol group, a thiophenol group, a mercaptopyridine group, an alcohol group, a mercaptan group, a lactam group, an oxime group, an amide group, an imide group, an azole group, an imidazole group, a pyrazole group, a diketene group, a formate group, and a combination thereof.

8. The three-dimensional printing kit of claim 1, wherein the polyhydroxy polyol is present in an amount of from about 1 wt % to about 15 wt % with respect to the total weight of the binding agent, and wherein the water-dispersible blocked polyisocyanate is present in an amount of from about 1 wt % to about 25 wt % with respect to the total weight of the binding agent.

9. The three-dimensional printing kit of claim 1, wherein a total moles of the multiple blocked isocyanate groups in the binding agent is from about 105 mol % to 120 mol % of a total moles of hydroxyl groups of the polyhydroxy polyol present in the binding agent.

10. A method of three-dimensional printing, comprising:
iteratively applying individual build material layers of a particulate build material comprising metal particles onto a support bed;
based on a 3D object model, selectively jetting a binding agent that is separate from the particulate build material to the individual build material layers to define individually patterned layers that are bound together to form a 3D green body object, wherein the binding agent comprises:
a polyhydroxy polyol selected from the group consisting of an acrylate polyol and a polyurethane polyol;
a water-dispersible blocked polyisocyanate having multiple blocked isocyanate groups, each having the chemical structure:

wherein B is a blocking group bonded to the carbon atom of the blocked isocyanate group through a labile bond that is breakable by heating to a deblocking temperature, wherein breaking the labile bond produces a released blocking group reacted with hydrogen and an isocyanate group; and
an aqueous vehicle.

11. The method of three-dimensional printing of claim 10, wherein the binding agent is applied by a thermal fluid jet ejector.

12. The method of three-dimensional printing of claim 10, further comprising heating the 3D green body object to the deblocking temperature, wherein the deblocking temperature is from about 100° C. to about 200° C.

13. The method of three-dimensional printing of claim 10, further comprising sintering the 3D green body object at a sintering temperature of from about 500° C. to about 3,500° C. to fuse the metal particles together and form a sintered 3D object.

* * * * *